(12) United States Patent
Yerxa et al.

(10) Patent No.: US 9,094,830 B2
(45) Date of Patent: Jul. 28, 2015

(54) MANAGING DATA TRANSFER ACROSS A NETWORK INTERFACE

(75) Inventors: Barry Fraser Yerxa, Ottawa (CA); Nils Patrik Lahti, Ottawa (CA); Jean Dolbec, Ottawa (CA)

(73) Assignees: BLACKBERRY LIMITED, Waterloo, Ontario (CA); 2236008 ONTARIO INC., Waterloo, Ontario (CA)

( * ) Notice: Subject to any disclaimer, the term of this patent is extended or adjusted under 35 U.S.C. 154(b) by 230 days.

(21) Appl. No.: 13/541,790

(22) Filed: Jul. 5, 2012

(65) Prior Publication Data

US 2014/0013395 A1 Jan. 9, 2014

(51) Int. Cl.
*H04L 29/06* (2006.01)
*H04W 12/08* (2009.01)

(52) U.S. Cl.
CPC ...................... *H04W 12/08* (2013.01)

(58) Field of Classification Search
CPC ....................................................... H04W 12/08
USPC ................................................. 726/4, 11, 12
See application file for complete search history.

(56) References Cited

U.S. PATENT DOCUMENTS

| | | | | |
|---|---|---|---|---|
| 5,829,041 | A * | 10/1998 | Okamoto et al. | 711/147 |
| 6,151,583 | A * | 11/2000 | Ohmura et al. | 705/7.26 |
| 7,228,550 | B1 * | 6/2007 | Eberhard et al. | 719/312 |
| 7,240,350 | B1 * | 7/2007 | Eberhard et al. | 719/314 |
| 8,650,620 | B2 * | 2/2014 | Chawla et al. | 726/4 |
| 2003/0028674 | A1 * | 2/2003 | Boden | 709/250 |
| 2003/0105620 | A1 * | 6/2003 | Bowen | 703/22 |
| 2003/0145235 | A1 * | 7/2003 | Choo | 713/201 |
| 2003/0149895 | A1 * | 8/2003 | Choo et al. | 713/201 |
| 2003/0172109 | A1 * | 9/2003 | Dalton et al. | 709/203 |
| 2004/0064721 | A1 * | 4/2004 | Murching et al. | 713/200 |
| 2007/0271594 | A1 * | 11/2007 | Wobber et al. | 726/2 |
| 2008/0052395 | A1 * | 2/2008 | Wright et al. | 709/224 |
| 2008/0196086 | A1 * | 8/2008 | Shintani et al. | 726/4 |
| 2009/0069018 | A1 * | 3/2009 | Babbar | 455/445 |
| 2009/0100524 | A1 * | 4/2009 | Honda | 726/26 |
| 2009/0184799 | A1 * | 7/2009 | Ishibashi | 340/5.8 |
| 2009/0328129 | A1 * | 12/2009 | Desai et al. | 726/1 |
| 2010/0053458 | A1 * | 3/2010 | Anglin et al. | 348/731 |
| 2010/0064043 | A1 * | 3/2010 | Iino et al. | 709/226 |
| 2011/0047597 | A1 * | 2/2011 | Mahaffey et al. | 726/3 |
| 2011/0047620 | A1 * | 2/2011 | Mahaffey et al. | 726/23 |
| 2011/0145920 | A1 * | 6/2011 | Mahaffey et al. | 726/22 |

(Continued)

OTHER PUBLICATIONS

EPO, Extended European Search Report relating to application No. 12175061.6 dated Nov. 23, 2012.

(Continued)

*Primary Examiner* — David García Cervetti
(74) *Attorney, Agent, or Firm* — Rowand LLP

(57) ABSTRACT

Described are systems and methods for managing data transfer from a communication device to a communication network over a wireless connection comprising determining that a requesting process on the communication device is authorized to establish a protected connection to the communication network; and, configuring a network interface on the communication device to allow data packets to be transmitted from the requesting process to the communication network over the protected connection, wherein the network interface is associated with the protected connection.

17 Claims, 10 Drawing Sheets

(56) References Cited

U.S. PATENT DOCUMENTS

| | | | |
|---|---|---|---|
| 2012/0131185 A1* | 5/2012 | Petersen et al. | 709/224 |
| 2012/0159578 A1* | 6/2012 | Chawla et al. | 726/4 |
| 2013/0054962 A1* | 2/2013 | Chawla et al. | 713/156 |
| 2013/0055347 A1* | 2/2013 | Chawla et al. | 726/3 |
| 2013/0073797 A1* | 3/2013 | Chowdhury | 711/103 |
| 2013/0160114 A1* | 6/2013 | Greenwood et al. | 726/21 |
| 2013/0332511 A1* | 12/2013 | Hala et al. | 709/203 |
| 2013/0332996 A1* | 12/2013 | Fiala et al. | 726/4 |
| 2014/0059655 A1* | 2/2014 | Beckley et al. | 726/4 |
| 2014/0156961 A1* | 6/2014 | Hadley | 711/163 |

OTHER PUBLICATIONS

Microsoft: "Getting to Know Windows Firewall", http://etutorials.org, Jan. 9, 2010, pp. 1-11, XP055044260, retrieved from the Internet: URL:http://web.archive.org/web/20100109213800/http://etutorials.org/Microsoft+Products/microsoft+windows+vista/Part+III+Securing+Windows+Vista/Chapter+13+Securing+Your+NetworkConnection/Getting+to+Know+Windows+Firewall/ [retrieved on Nov. 14, 2012], p. 1, lines 35-48, p. 9, line 1, p. 10, last line.

CIPO, CA Office Action relating to Application No. 2,814,916, dated Feb. 11, 2015.

* cited by examiner

MANAGING DATA TRANSFER ACROSS A NETWORK INTERFACE

FIELD

The present matter relates to communication devices and in particular to a method and system for managing data transfer across a communication device to a communication network over a wireless connection.

BACKGROUND

Communication devices are commonly used to transmit data across communication networks, including cellular networks. Often cellular networks have protected, zero-rated or data-sensitive connections that can only be used by authorized applications and processes. Data, including audio or other data, can be transmitted across such protected connections from one or more applications or processes on a device.

BRIEF DESCRIPTION OF DRAWINGS

In order that the subject matter may be readily understood, embodiments are illustrated by way of examples in the accompanying drawings, in which.

DETAILED DESCRIPTION

According to an aspect, the present disclosure describes a method implemented on a communication device for managing data transfer from the communication device to a communication network over a wireless connection, the method comprising determining that a requesting process on the communication device is authorized to transfer data to the communication network over a protected connection; and, configuring a network interface on the communication device to allow data packets to be transferred from the requesting process to the communication network over the protected connection, wherein the network interface is associated with the protected connection.

According to another aspect, the present disclosure describes a communication device for managing data transfer from the communication device to a communication network over a wireless connection, the communication device comprising an authorization process module for authorizing a requesting process to transmit data to the communication network over a protected connection; and a cellular data services controller for configuring a network interface on the communication device to allow data packets to be transmitted from the requesting process to the communication network over the protected connection, wherein the network interface is associated with the protected connection.

According to another aspect, the present disclosure describe a communication device for controlling data transfer across a network interface of a communication network, the communication device comprising: a memory; and, computer readable instructions stored on memory and executable by a processor to: determine that a requesting process on the communication device is authorized to transfer data to the communication network across a protected connection; and, configure a network interface on the communication device to allow data packets to be transmitted from the requesting process to the communication network over the protected connection, wherein the network interface is associated with the protected connection.

According to another aspect, the present disclosure describes a computer readable storage medium comprising computer-executable instructions which, when executed, cause a processor to: determine that a requesting process on the communication device is authorized to transfer data to the communication network across a protected connection; and, configure a network interface on the communication device to allow data packets to be transmitted from the requesting process to the communication network over the protected connection, wherein the network interface is associated with the protected connection.

Example Network Infrastructure 100

Figure 1:
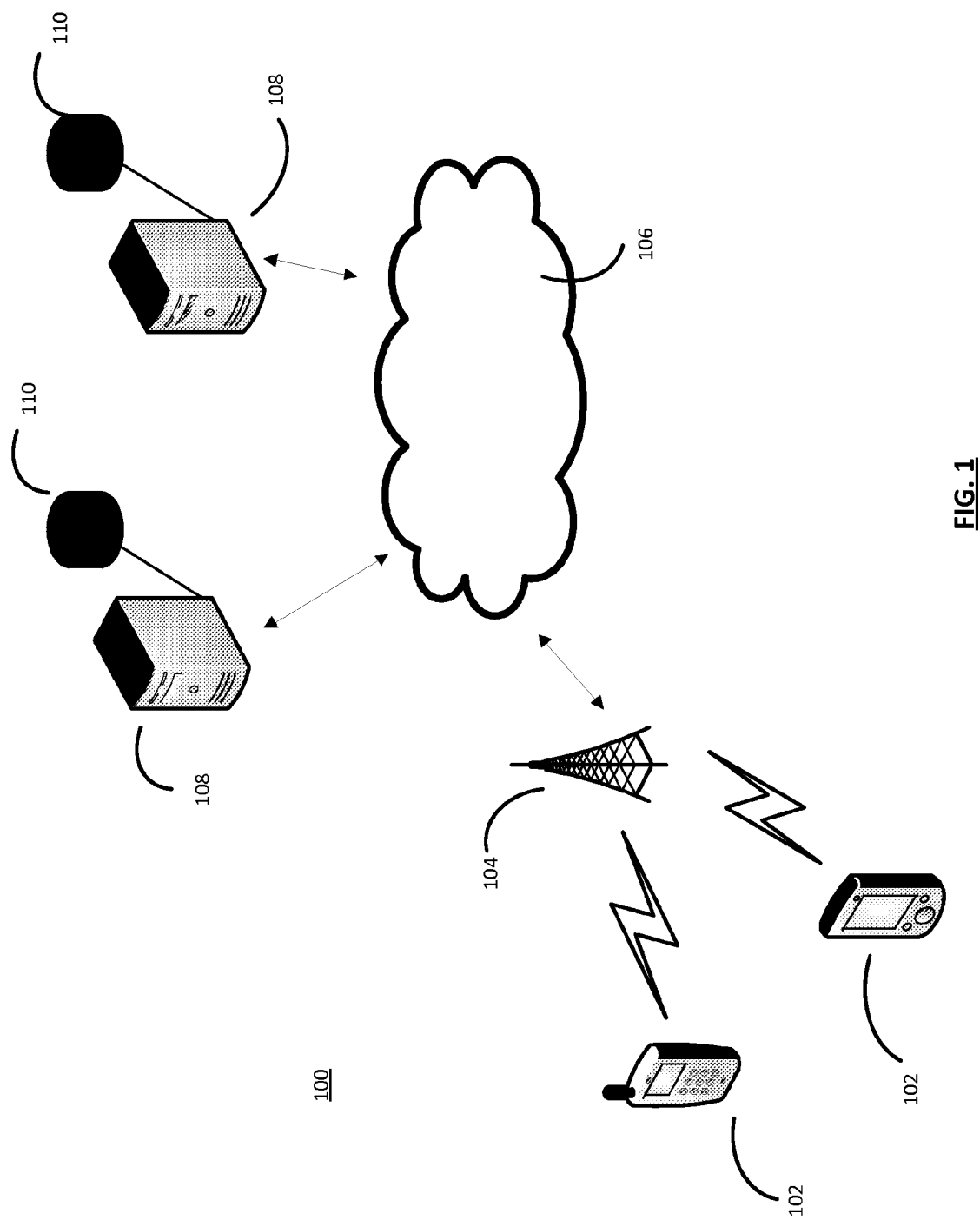
FIG. 1 is a block diagram illustrating a communication network.

For convenience, like numerals in the description refer to like structures in the drawings. Referring to FIG. 1, a typical telecommunication infrastructure is illustrated generally by numeral 100. The telecommunication infrastructure 100 includes one or more communication devices 102, one or more base stations 104, a communication network 106 and a plurality of network servers 108.

The communication devices 102 include wireless computing devices such as a smart phone, a personal digital assistant (PDA), and the like. The communication devices 102 are in communication with one of the base stations 104. The base stations relay data between the communication devices 102 and the network servers 108 via the communication network 106. Accordingly, the communication network 106 may include several components such as a wireless network, a relay, a corporate server and/or a mobile data server for relaying data between the base stations 104 and the network servers 108.

The network servers 108 include servers such as a Web server, an application server 108, and an application server with web services. It will be appreciated by a person of ordinary skill in the art that the telecommunication infrastructure 100 described herein is exemplary and that changes may be made to one or more components to accommodate different network configurations without affecting the scope of the aspects described herein.

Example Communication Device 102

Figure 2:
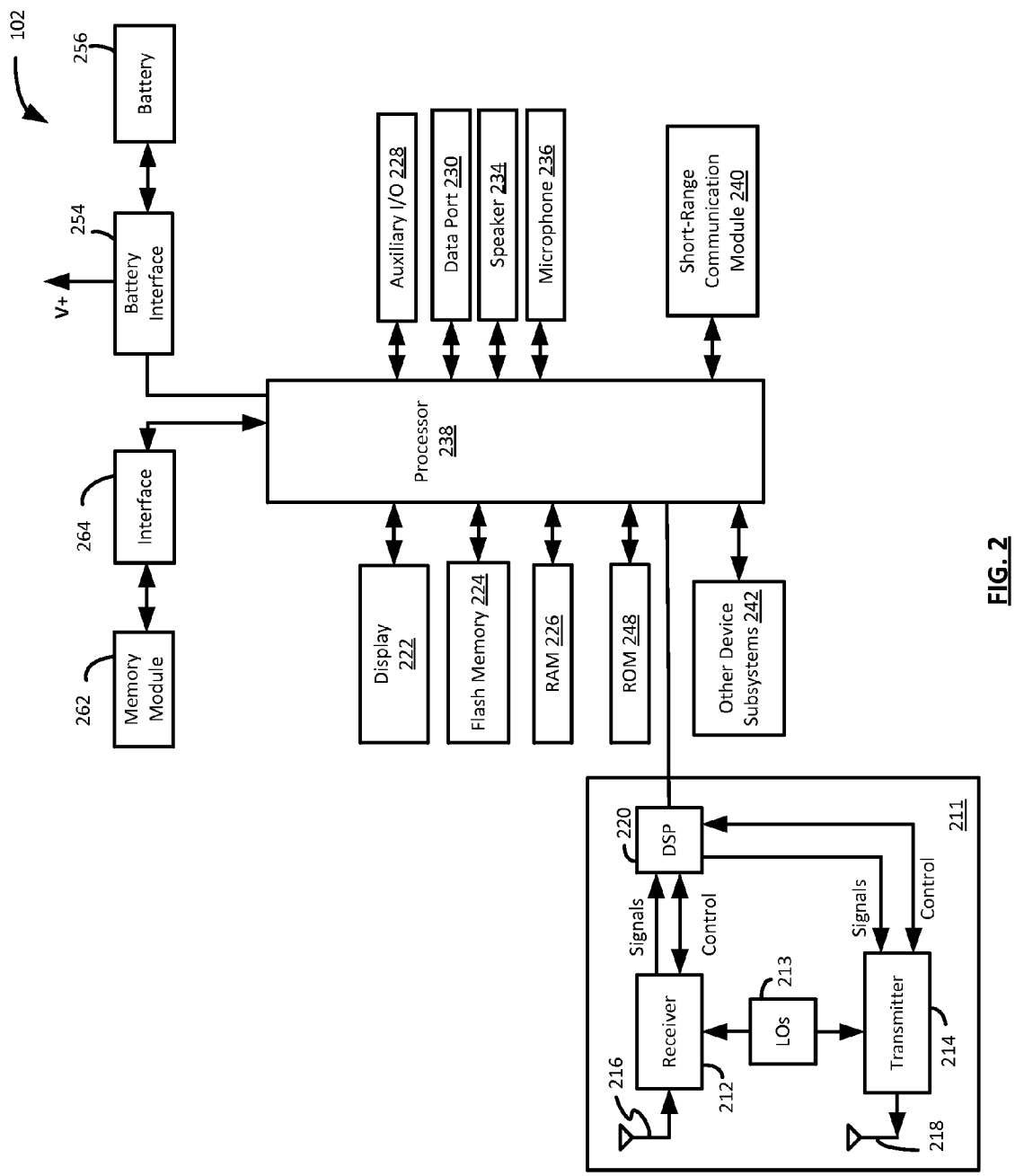
FIG. 2 is a block diagram illustrating components of a mobile communication device.

Referring to FIG. 2, a typical communication device 102 is illustrated in greater detail. The communication device 102 is often a two-way communication device having both voice and data communication capabilities, including the capability to communicate with other computer systems. Depending on the functionality provided by the communication device 102, it may be referred to as a data messaging device, a two-way pager, a cellular telephone with data messaging capabilities, a wireless Internet appliance, a smartphone, a table computer, or a data communication device.

The communication device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which the communication device 102 is intended to operate.

The communication device 102 includes a processor 238, which controls general operation of the communication device 102. The processor 238 can interact with additional device subsystems such as a display 222, a flash memory 224, a random access memory (RAM) 226, a read only memory (ROM) 248, auxiliary input/output (I/O) subsystems 228 (such as a keyboard or trackball, for example), a data port 230, a speaker 234, a microphone 236, a short-range communications subsystem 240 such as Bluetooth™ for example, and any other device subsystems or peripheral devices generally designated at 242.

Operating system software used by the processor 238 may be stored in a persistent store such as the flash memory 224 (which may be a ROM), a ROM 248 or similar storage element (not shown). The operating system, specific device applications, or parts thereof, may be temporarily loaded into a volatile store such as RAM 226.

The processor 238, in addition to its operating system functions, enables execution of software applications on the communication device 102. A predetermined set of applications, which control basic device operations, is installed on the communication device 102 during its manufacture. These basic operations typically include data and voice communication applications, for example. Additionally, applications may also be loaded onto the communication device 102 through the network 106, an auxiliary I/O subsystem 228, serial port 230, short-range communications module 240, or any other suitable subsystem 242, and installed by a user in RAM 226, ROM 248 or flash memory 224, for execution by the processor 238. Such flexibility in application installation increases the functionality of the communication device 102 and may provide enhanced on-device features, communication-related features, or both.

The short range communication module 240 provides for communication between the electronic device 102 and different systems or devices, which need not necessarily be similar devices. For example, the short range communication module 240 may include an infrared device and associated circuits and components, or a wireless bus protocol compliant communication mechanism such as a Bluetooth® communication module to provide for communication with similarly-enabled systems and devices.

The display 222 is used to visually present an application's graphical user interface (GUI) to the user. The user can manipulate application data by modifying information on the GUI using an auxiliary input/output device 232, such as a keyboard for example. Depending on the type of communication device 102, the user may have access to other types of input devices, such as, for example, a scroll wheel, trackball, light pen or touch sensitive screen.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the communication device 102 also includes a removable memory module 262 (typically including flash memory) and a memory module interface 264. Network access may be associated with a subscriber or user of the electronic device 102 via the memory module 262, which may be a Subscriber Identity Module (SIM) card for use in a GSM network or other type of memory module for use in the relevant wireless network type. The memory module 262 may be inserted in or connected to the memory module interface 264 of the electronic device 102.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The communication device 102 also includes a battery 256 as a power source, which is typically one or more rechargeable batteries that may be charged, for example, through charging circuitry coupled to a battery interface 254 such as the serial data port 230. The battery 256 provides electrical power to at least some of the electrical circuitry in the electronic device 102, and the battery interface 254 provides a mechanical and electrical connection for the battery 256. The battery interface 254 is coupled to a regulator (not shown) which provides power V+ to the circuitry of the electronic device 102.

Example Persistent Publish and Subscribe Service 300

A persistent publish and subscribe ("PPS") service allows a process (i.e. a publisher) to publish data to a file (e.g. an object file) that can be read by one or more permitted subscribers. The permitted subscribers may be processes or applications operating or running on the same device as the publisher. The publisher may not have to identify the intended recipients or subscribers; instead, the published data can be broadcast to permitted subscribers through the file. The subscribers can be provided with access to the service in accordance with a set of permissions. Permissions can include the ability to receive certain published content or to communicate data to the publisher or to read from and/or write to the file. The PPS service can be associated with specific processes, applications or network connection such that only one PPS service operates for a specific process, application or network connection. It is understood that PPS services can have additional applications not specifically described. A PPS service can be in operation on a communication device 102, on a server 108 or on one or more devices 102 in communication (e.g. over a network 106). A PPS service can be used on a communication device 102 to allow only permitted processes on the communication device 102 to communicate with one another.

Figure 3:
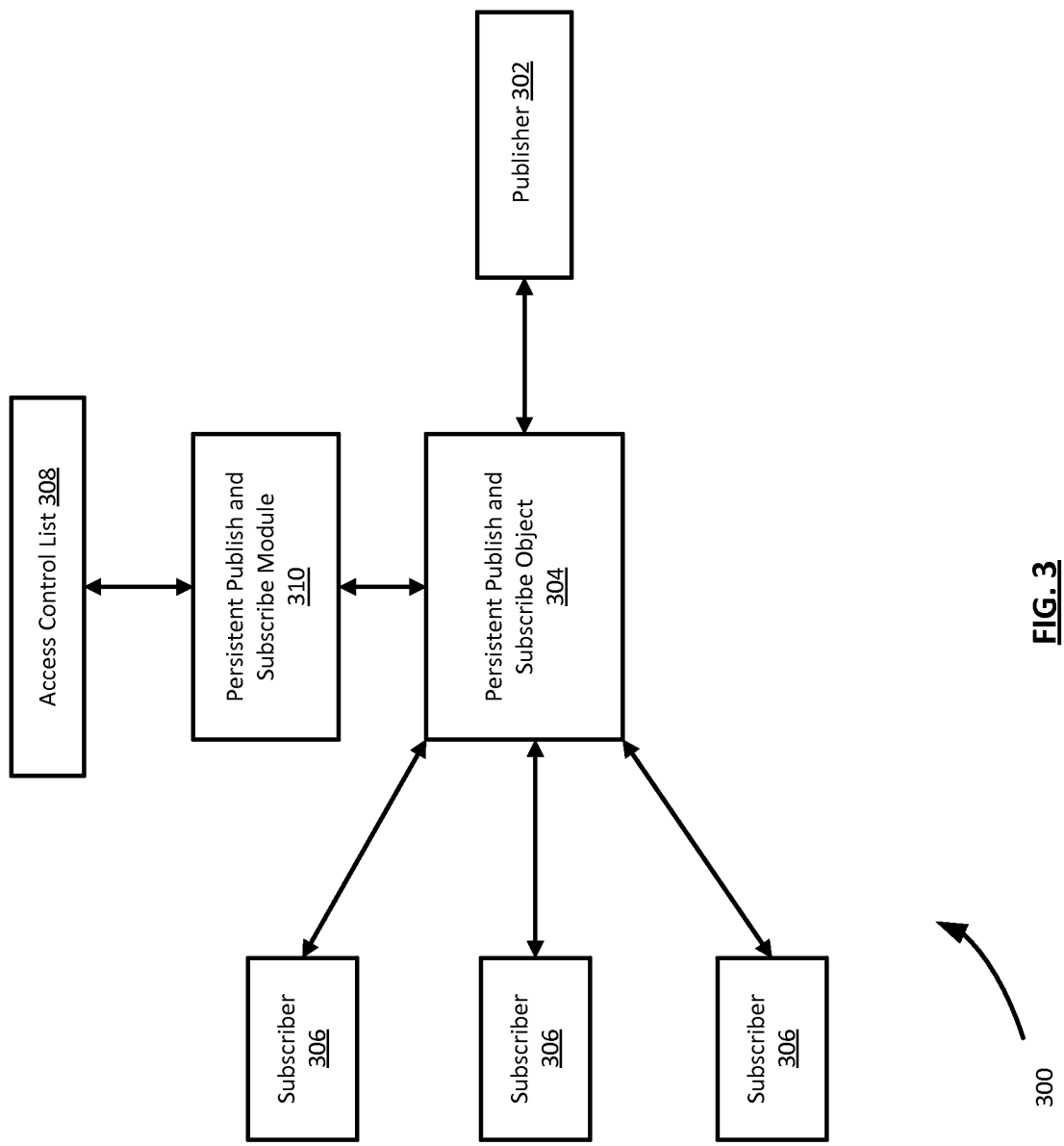
FIG. 3 is a block diagram illustrating components of a publish and subscribe service.

FIG. 3 illustrates an exemplary embodiment of a PPS service 300. In the illustrated embodiment, a publisher 302 is in communication with a PPS object 304. Three subscribers 306 are also in communication with the PPS object 304. A PPS module 310 is associated or coupled with both the PPS object 304 and an access control list ("ACL") 308. In one or more embodiments, the PPS service 300 is operating on a communication device 102 along with the subscribers 306 and publisher 302.

The PPS module 310 can be an application that is running on the communication device 102. For example, a processor 238 on the device 102 can be executing a set of instructions stored on a memory in order operate the PPS module 310. According to an embodiment, the ACL 308 is a file stored on the device 102 (e.g. in memory 224) that the PPS module 308 can read from and/or write to. In alternative embodiments, the ACL 308 may be stored remotely and accessed over or through a communication network 106. The ACL 316 can be configured to store one or more permissions associated with the subscribers 306. For example, the permissions associated with a subscriber 306 may identify the publisher 302 and/or PPS object 304 that the subscriber 306 is permitted to communicate with. By way of further example, a subscriber 306 can be considered a permitted subscriber 306 with respect to a PPS object 304 or publisher 302 if that subscriber 306 is permitted to communicate with the publisher 302 through the PPS object 304.

According to an embodiment, the PPS object 304 is an object file that is instantiated by the PPS module 310 on request from a subscriber 306. The PPS object 304 can be stored at the device 102 or remotely at another location, for example. The publisher 302 can send or publish data to the PPS object 304 such that data sent to the PPS object 304 is broadcast or accessible to one or more permitted subscribers 306. Similarly, the publisher 302 can receive data from the PPS object 304 sent by specific permitted subscribers 306. Such received data can be correspondence from one or more permitted subscriber 306, for example. The transmission of data to and from the PPS object 304 can comprise writing data to and reading data from the PPS object 304, respectively.

In the illustrated embodiment, the subscribers 306 are processes or applications operating on the communication device 102 on which a PPS service 300 operates. For example, the PPS object 304 can be stored or maintained on the same communication device 102. Similarly, the publisher 302 can be a process or application operating on the same communication device 102.

The illustrated embodiment shows three subscribers 306. It is recognized that more or fewer subscribes 306 can use or be implemented in the PPS service 300. A subscriber 306 subscribes to data stored at or sent to the PPS object 304 by the publisher 302. For example, a subscriber 306 can read data from the PPS object 304 in accordance with permissions provided in the ACL 308. Similarly, a subscriber 306 may be permitted to write data to the PPS object 304 in order to communicate with the publisher 302 in accordance with permissions provided in the ACL 308. A PPS object 304 can be associated with a particular process or network connection (e.g. a protected network connection). In accordance with an embodiment there is one ACL 308 per PPS object 304. Alternatively, there can be one ACL 308 for maintaining permissions with respect to multiple PPS objects 304. Generally, the ACL 308 can be used to define, for any topic (or PPS object 304) and subscriber 306, the right of that subscriber 306 to receive publications on that topic or to request persistent delivery of a publication on that topic. The ACL 316 can also define the level of protection that can apply to each topic such as, for example, the identity of subscribers 306 permitted to read data from a particular PPS object 304.

In an embodiment, correspondence from a subscriber 306 through the PPS object 304 comprises a request to establish a connection to a communication network 106 or to connect to a communication network 106 over an existing connection. In a further embodiment, there are no other methods for a subscriber 306 to request to connect to a communication network 106 over a particular network connection nor are there other methods for a subscriber 306 to request to establish a particular connection to a communication network 106. Additionally, the PPS object 304 may be associated with a specific network connection or network interface such that all requests to connect communications between processes on the communication device 102 relating to connecting to a communication network over that specific network connection pass through the PPS object 304. Thus, in accordance with such an embodiment, only processes (or applications) that are identified in an ACL 308 with permission to transmit data to a communication network 106 over a specific network connection can communicate with the PPS object 304.

Example Communication Device Infrastructure 400

Figure 4:
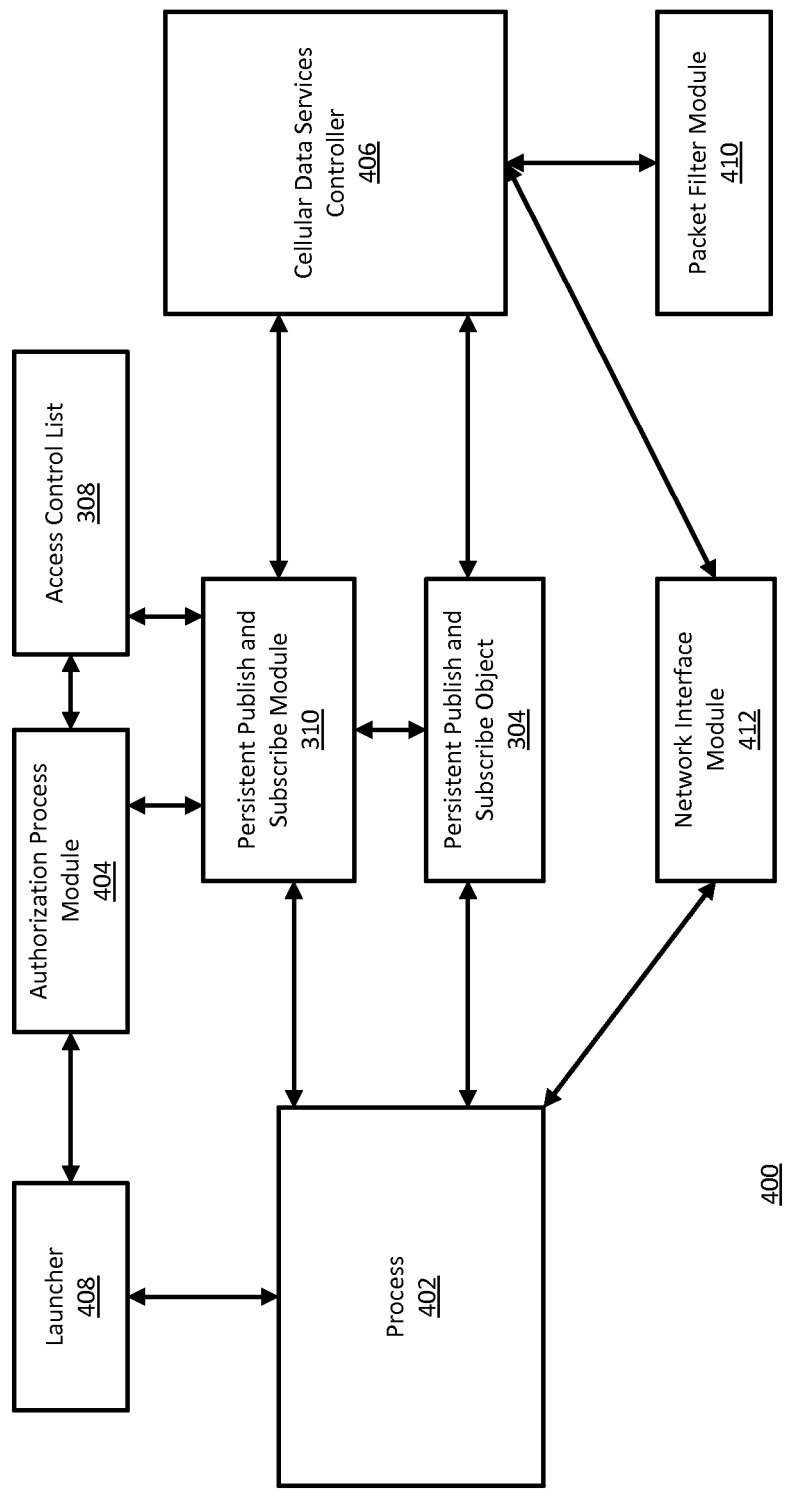
FIG. 4 is a schematic diagram illustrating the modules of a mobile communication device.

FIG. 4 illustrates the infrastructure of an embodiment of a communication device 102. The communication device 102 comprises various modules, including a process 402, a launcher 408, an authorization process module 404, a PPS module 310, a PPS object 304, an ACL 308, a cellular data services controller ("CDSC") 406, a packet filter module 410 and a network interface module 412. Data may be transferred between two or more of the noted modules. The modules may be applications, processes, files or hardware and/or software components on a communication device 102. The functionality of any or all of the identified modules can be combined in one or more module.

In accordance with the illustrated embodiment, the process 402 is an application or process that is initiated or running or operating on the communication device 102. A launcher 408 is associated with the requesting process 402. The launcher 408 is a process that is used to initiate or launch the process 402. For example, the launcher 408 is a process coupled to the process 402 that assists with certain functionality of launching the process 402. By way of further example, the launcher 408 comprises an interface through which the process 402 can be initiated or launched. For example, the launcher 408 may comprise a user interface on the communication device 102 through which the process 402 can be launched or initiated. There may be one or more other processes that are initiated or running or operating on the communication device 102 along with or instead of the process 402 and to which the description in FIG. 4 applies. For example, another process (not shown) can be associated with the launcher 408, PPS module 310, the PPS object 304 and the network interface module 412.

According to the illustrated embodiment, a PPS service 300 is implemented on the communication device 102 such that the process 402 comprises a subscriber 306 and the CDSC 406 comprises the publisher 302. The process 402 and the CDSC 406 may each also be in communication with or coupled to the network interface module 412 and the PPS module 310. The PPS module 310, PPS object 304 and one or more ACL 308 operate as the PPS service 300 between the CDSC 406 and the process 402. It is understood that there can be more than one process 402 and that each process 402 can be a subscriber 306 to the same PPS object 304. In accordance with an embodiment, the PPS service 300 shown in FIG. 4 (i.e. the PPS module 310, the PPS object 304, the ACL 308, the process 402 and the CDSC 406) can be associated with a specific network interface or network connection used to transmit data to and from or communicate with a communications network 106. For example, the PPS service 300 on the communication device 102 can be associated exclusively with a protected connection such that the PPS object 304 is the only mechanism that the process 402 can use to communicate with the CDSC 406 in respect of the protected connection. It is recognized that in other embodiments, there may be other mechanisms for allowing communication between the CDSC 406 and process 402 and/or that there may be multiple PPS objects 304 associated with the protected connection.

Still with reference to the illustrated embodiment in FIG. 4, the authorization process module 404 is in communication with the launcher 408, ACL 308 and PPS module 310. The authorization process module 404 can be configured to receive authorization requests from the process 402. In accordance with an exemplary embodiment, the authorization process module 404 is configured to authorize a process 402 to transmit data to the communication network 106 over a protected connection. An example authorization request can include the identity of the process 402 and the identity of the communication network 106 that the process 402 is requesting to establish a connection to. A further example authorization request can include the identity of the process 402, the identity of a protected connection or network interface that the process 402 is requesting authorization to connect to. The identity of the process 402 can include a process ID, for example. It is understood that the process 402 can be an application running on a communication device 102 such that the authorization request is transmitted within the communication device 102. The identity of the network interface or network connection can include an IP address or a port number for example.

In a further embodiment, the authorization module 404 is configured to verify the capabilities of the process 402. For example, when the process 402 is initiated (e.g. on the communication device 102), the launcher 408 (i.e. a process running in association with the process 402) extracts certain capabilities from the process's 402 manifest and transmits the capabilities to the authorization process module 404. A process's or application's manifest can be data (e.g. metadata) associated with the process or application (e.g. the process 402) that contains identifying information and/or permission information and/or session information in respect of the process or application. The authorization process module 404 verifies the capabilities of the process 402. For example, the authorization process module 404 can maintain a list or descriptions of authorized applications or processes and their capabilities that it can then compare to the capabilities of the process 402 as extracted by the launcher 408. For example, the process 402 can request to connect to a communication network 106 over an existing protected connection. If the capabilities are verified then the authorization process module 404 authorizes the process 402 to connect to the communication network 106 through the protected connection. If the capabilities are not verified then the authorization process module 404 declines to authorize the process 402 to connect to the network interface or network connection (e.g. the protected connection). In a further example, the process 402 can request to establish a protected connection to the communication network 106. If the capabilities are verified then the authorization process module 404 authorizes the process 402 to establish the protected connection. If the capabilities are not verified then the authorization process module 404 declines to authorize the process 402 to establish the protected connection. The capabilities may provide information that identifies the specific communication networks or network connection that the process 402 is authorized or permitted to connect to or to establish. For example, the capabilities can indicate that a certain application or process is authorized to transmit data to a communication network 106 over a specific protected connection. Similarly, the capabilities may provide information that identifies the specific communication networks or network connection(s) that the process 402 is not permitted or is not authorized to establish connections over or to connect to. It is recognized that the authorization process module 404 may authorize the process 402 to establish connections to one or more communication networks while declining to authorize the process 402 to establish connections to one or more other communication networks. Similarly, the authorization process module 404 can authorize the process 402 to transmit data to a communication network 106 across a certain protected connection but not to a communication network 106 across another protected connection. Generally, the role of the authorization process module 404 is to verify or authorize that a process 402 is permitted to establish or to access a protected connection and the role of the launcher 408 is to provide the authorization process module 404 with identifying information regarding the process 402.

In accordance with the embodiment illustrated in FIG. 4, the authorization process module 404 is in communication with the ACL 316. For example, the authorization process module 404 can transmit data (e.g. write data) to the ACL 316 and can receive data (e.g. read data) from the ACL 316. In accordance with an exemplary embodiment, the ACL 316 maintains a set of permissions for establishing connections to communication networks 106 or for transmitting data across existing connections to communication networks 106. For example, the ACL 316 can be a file that stores a list of applications or processes and a list of communication networks and/or existing connections (e.g. protected connections) that each listed application or process is permitted to transmit data to. In an embodiment, the ACL 316 maintains or stores the identities of the processes or applications that are permitted to request to establish a connection to specific communication networks 106 and the identities of the processes or applications that are permitted to connect to specific protected connections. For example, the ACL 316 can maintain or store a "white list" of applications or processes that are permitted to transmit data across a specific protected connection (e.g. the protected connection associated with the PPS object 304, for example). In yet another embodiment, the ACL maintains or stores permissions for one or more applications or process indicating which network connections that each application or process is permitted to transmit data across. The authorization process module 404 can amend, add to or remove one or more permissions maintained at the ACL 316. For example, the authorization process module 404 can edit the data stored on the ACL 316 such that the process 402 is noted as having permission to request to connect to the communication network 106 across the protected connection associated with the PPS object 304. For example, the authorization process module 404 can add the identity (or permission(s)) of a process 402 to an ACL 308 after the authorization process module 404 has verified the capabilities of the process 402 as provided, for example, by the launcher 408. According to an exemplary embodiment, the permissions to connect to a communication network 106 across a protected connection or network interface that are maintained by the ACL 316 comprise permissions to read from and/or write to the PPS object 304 associated with the specific network interface or network connection.

Still with reference to the embodiment illustrated in FIG. 4, the CDSC 406 is a process or an application running on the communication device 102. The CDSC 406 configures and manages connections to communication network(s) 106 (e.g.

a wireless network) on the communication device 102. By way of example, the CDSC 406 can provide a communication path to a process 402 through which the process 402 can request to connect to a specific communication network 106 across a specific network connection or network interface. Similarly, the CDSC 406 can provide a communication path to a process 402 through which the process 402 can request to establish a connection to a communication network 106. According to the illustrated embodiment, the CDSC 406 is in communication with the PPS object 304, the PPS module 310, the packet filter module 410 and the network interface module 412. More specifically, the CDSC 406 can transmit data to or receive data from each of the identified modules. For example, the CDSC 406 communicates with the process(s) 402 through the PPS object 304 using the PPS service 300 such that the CDSC 406 is the publisher 302 in the PPS service 300. It is recognized that other methods of communication between processes, applications or modules can be used in alternative embodiments. In another example, the CDSC 406 can configure the process 402 to connect to a communication network 106 through a network connection on the communication device 102. For example, the CDSC 406 can populate a packet data protocol context with information and data from the process 402 and transmit the packet data protocol context to the network interface module 412 where the of the connection may be completed or configured. Further, the CDSC 406 can request or instruct that the packet filter module 410 apply one or more pre-determined rules to restrict data transfer across a specified network interface or network connection (e.g. the protected connection). Such a request or instruction may be automatically transmitted or communicated to the packet filter module 410 after the CDSC 406 receives confirmation that a network connection (e.g. the protected connection) is open, for example.

The network interface module 412 configures the network interfaces and drivers for the transport technology that is used by a process 402 (e.g. Wi-Fi network, cellular networks, and wired networks). The network interface module 412 may also manage communications and data transmission through network connections and/or network interfaces. For example, the network interface module 412 may receive requests (or calls) from the CDSC 406 to activate a packet data protocol ("PDP") context from a specific process 402 to establish a specific network connection over which data can be transmitted. The network interface module 412 can then activate the PDP context (in accordance with the general packet radio service ("GPRS") or other network protocol, for example) thereby opening a data tunnel over which data can be transmitted. In one or more embodiments, one PDP context can be activated for allowing multiple processes or applications to transmit data to a communication network 106 across a connection. The network interface module 412 can comprise a radio transmitter on the communication device 102.

In an exemplary embodiment, a PDP context is used to facilitate the transmission of data from one or more processes 402 over a protected connection. It is understood that the PDP context can be used to facilitate the transmission of data from processes 402 over other network connections. The communication network 106 may be a GPRS. To be connected to the GPRS, a subscriber 306 (e.g. a communication device 102 or an application) must first be allocated an activated PDP context. The PDP context is a data structure, which can be maintained at the network interface module 412, and which contains the subscriber's 306 session information. The PDP context can contain each subscriber's 306 session information. The session information can include the subscriber's 306 identification (e.g. International Mobile Subscriber Identity or process ID). In some embodiments, the session information may comprise the access point for the identified network connection and the access point may identify the GPRS network. After a PDP context is activated the network connection (e.g. protected connection) is open and able to receive connections. In an embodiment, the PDP context is populated at or by the CDSC 406, however it is understood that the PDP context can be populated at or by the network interface module 412.

Still with reference to FIG. 4, the packet filter module 410 manages the filtering of data packets transmitted to the communication network 106 through the network interface associated with the protected connection. It is understood that the network interface is associated with the protected connection which in turn is associated with the PPS object 304. For example, all data passing from the commination device 102 over the protected connection passes through the network interface. The packet filter module 410 may be in communication with the CDSC 406 for receiving instructions indicating the type, manner and/or magnitude of packet filters to apply to data passing over, through or to the network interface. For example, the packet filter module 410 may comprise or be configured to apply a set of pre-determined rules, such as packet filter rules to all data transferred over the network interface and/or over a particular network connection. One or more packet filter rules can be applied over the network interface in order to filter packets transmitted to or through the network interface. For example, a blocking rule, such as a "block all" packet filter rule prevents all packets from traveling over the network interface, and an "allow" packet filter rule allows packets from one or more identified sources (e.g., IP addresses, process ID numbers) to pass through the network interface. The "block all" and "allow" packet filter rules can be used together so that data packets coming from all sources except for those identified in the "allow" packet filter rule are blocked or prevented from passing through the network interface to the communication network 106. In accordance with an embodiment, the CDSC 406 instructs the packet filter module 410 of the identity of the applications or processes to be added to the "allow" packet filter rule so that data transmitted from such identified applications or processes to the network interface is not blocked by the "block all" rule.

In accordance with one or more embodiments, the PPS service 300 is used to manage communications between process 402 and the CDSC 406. For example, the PPS module 308 manages all communication between process 402 and the CDSC 406 in respect of the protected connection. The PPS module 308 can instantiate a single PPS object 304 for a specific network interface or network connection so that all communication between the process and the CDSC 406 with respect to the specific network interface are communicated through the PPS object 304. According to an embodiment, the PPS object 304 is associated with a protected connection. According to an embodiment, a process 402 transmits information to the CDSC 406 by writing to the PPS object 304 and the CDSC 406 receives such correspondence by reading from the PPS object 304. Similarly, the CDSC 406 corresponds with a process 402 by writing to the PPS object 304 and the process 402 receives correspondence by reading from the PPS object 304. As noted above, the CDSC 406 may be considered the "publisher" under the PPS service 300, so that it need not identify the recipients of correspondence or information or data that it writes to the PPS object 304. Similarly, the process may be considered a subscriber 306 so that it will only receive information, data or communication that it subscribes to. Information, data or communications that a process subscribes to can be limited to a specific network connection or network interface, for example.

According to an embodiment, the ACL 308 is associated with each PPS object 304 in order to control, manage and restrict access to the PPS object 304 to specifically identified applications (or subscribers 306). For example, the ACL 308 may have a list of processes or applications (e.g. identified by IP address or process identification number, etc.) that have permission to write to and/or read from a specific PPS object 304 associated with a specified network interface or network connection. By way of further example, there may be an ACL 308 associated with the PPS object 304 which in turn is associated with a protected connection. The CDSC 406 and/or the authorization process module 404 may have the ability to edit the ACL 308 in order to provide permission for identified applications to read from and write to one or more PPS objects 304.

Example Connection Protocol 500

Figure 5:
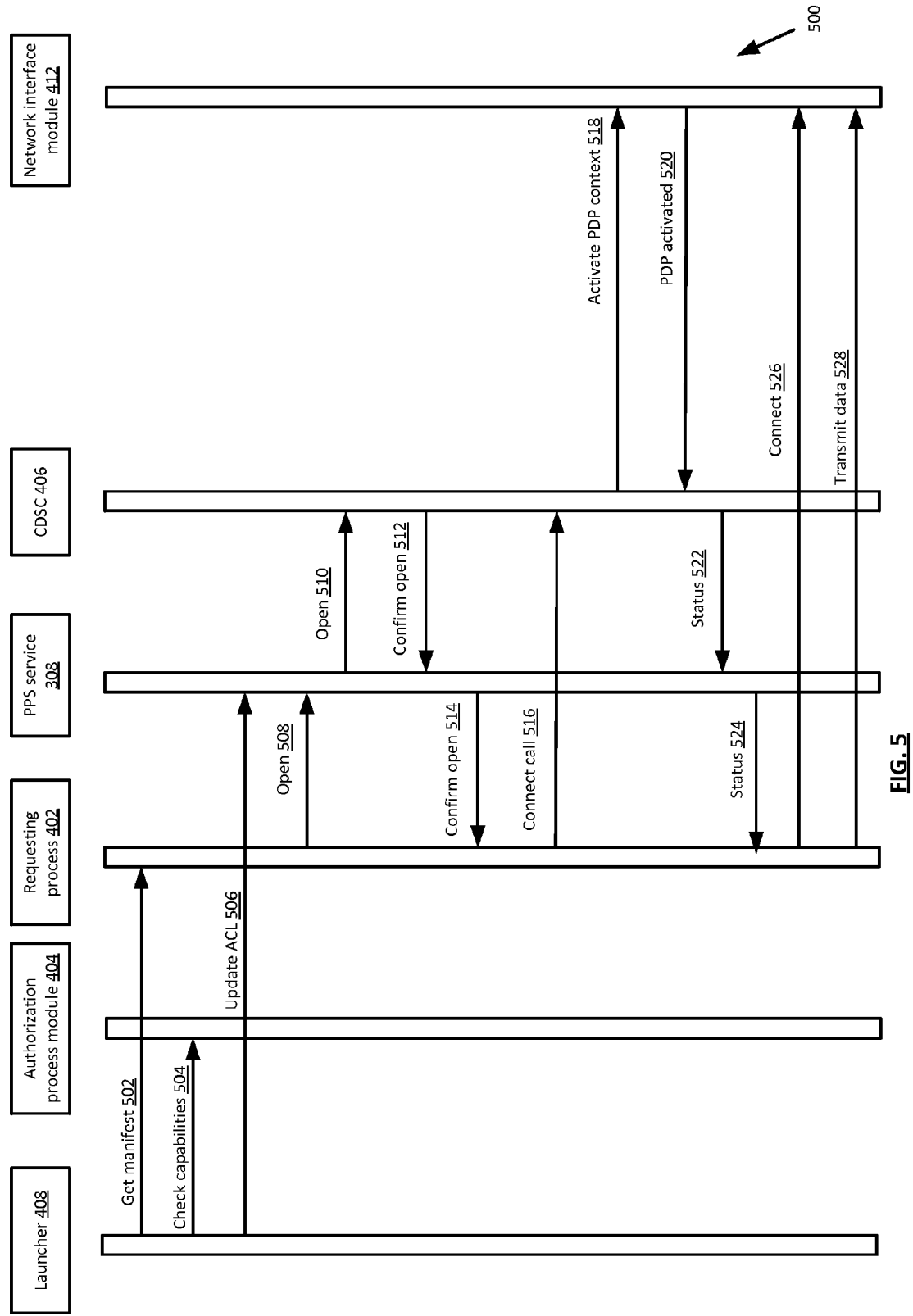
FIG. 5 is a flowchart illustrating the data flow in a communications device to establish a network connection.

With reference to FIG. 5, a sequence of communications 500 that can be used on a communication device 102 to connect to a network interface or communication network 106 will now be described. According to the sequence of communications identified at numeral 500 there is control over the identity of the applications or processes that can connect to the communication network 106, but there may be no control over the data that passes through the network interface from such applications or processes.

At 502, the launcher 408 retrieves the capabilities of the requesting process 402 from the manifest (e.g. metadata) of the requesting process 402. It is understood that the requesting process 402 is an example or embodiment of the process 402 described with reference to FIG. 4. At 504 the launcher 408 checks the retrieved capabilities with the authorization process module 404. For example, the launcher 408 can transmit the requesting process's 402 capabilities to the authorization process module 404 and, in response, the authorization process module 404 can verify whether the requesting process 402 has the capabilities that permit it to connect to a network connection (e.g. a protected connection). The authorization process module 404 may perform this step by using a set of pre-determined rules for verifying selected capabilities from a requesting process 402.

At 506 the authorization process module 404 updates the ACL 308 to ensure that the requesting process 402 is noted or identified as permitted or authorized to correspond with the CDSC 406 using the PPS service 300 for certain network connections, which may be determined or identified in the capabilities of the requesting process. For example, the authorization process module 404 can edit the ACL 308 to ensure that the requesting process 402 is noted as permitted to connect a communication network 106 through one or more network connections. The permitted network connections can be part of the requesting process's 402 manifest or capabilities for example. Alternatively, the ACL 308 may only indicate that the requesting process 402 is permitted to connect to any network connection that it requests a connection to on the communication device 102. It is understood that there may be other methods for maintaining a record or storing the identities of applications or processes that are permitted to access certain network connections.

At 508, the requesting process 402 attempts to open communication with the CDSC 406. For example, the requesting process 402 can request from the PPS service 300 (e.g. the PPS module 310) that a PPS object 304 be opened in respect of a specified network connection (e.g. a protected connection). For example, the request to open the PPS object 304 could comprise an identification of the requesting process 402 (e.g. the process ID) and the identification of the network connection or network interface (e.g. port number or IP address). At 510, the PPS service 300 (e.g. the PPS module 310) transmits the open PPS object 304 request to the CDSC 406. The CDSC 406 can then verify with the ACL 308 whether the requesting process 402 is permitted or authorized to connect to the identified network connection. Alternatively, verifying or confirming with the ACL 308 whether the requesting process 402 can access or connect to a specific network connection is performed by the PPS module 310 checking the ACL 308 (rather than by the CDSC 406 checking with the ACL 308).

If permission for the requesting process 402 to connect to the identified network connection (e.g. a protected connection) is verified (i.e. the requesting process 402 has permission), the CDSC 406 instructs the PPS module 308 to open or instantiate a PPS object 304 if one is not already open or instantiated and to grant read and/or write access for the PPS object 304 to the requesting process 402 (at 512). If permission is not verified, then read and write access for the PPS object 304 is not granted to the requesting process 402 and the requesting process 402 will therefore not be permitted to request form the CDSC 406 that it connect to the network connection. It is understood that the ACL 308 and/or the PPS module 310 and/or the CDSC 406 may indicate whether the requesting process 402 is authorized or has permission to only read from or only write to the PPS Object 304.

At 514, the PPS service 300 (e.g. the PPS module 310) can open or instantiate the PPS object 304 (if one is not already opened or instantiated) and notify the requesting process 402 of this fact. The requesting process 402 may then be in a position to request that the CDSC 406 connect it to the associated network connection (e.g. the network connection associated with the PPS service 300).

At 516, the requesting process 402 transmits a connection request (e.g. by making a connection call) to the CDSC 406 through the PPS service 300. For example, the requesting process 402 can write a message to the PPS object 304 requesting that the CDSC 406 open a connection to a specific network connection for the requesting process 402 to transmit data through. The connection request from the requesting process 402 can be for connecting to a specific network connection (e.g. a protected connection). It is recognized that other methods or protocols for initiating a connection from a specific application can be performed. Alternatively, for example, the PPS service 300 is not used and another method of communicating a connection request from the requesting process 402 to the CDSC 406 can be performed.

At 518, in response to receiving the connection request (e.g. through the PPS service 300) the CDSC 406 requests that the network interface module 412 activate a PDP context for the identified network connection. For example, the network interface module 412 may configure the PDP context for the requesting process 402 and the associated network connection. The request communicated from the CDSC 406 to the network interface module 412 can comprise the identity of the requesting process 402 along with certain other information in respect of the requesting process 402 in order to allow the network interface module to populate the PDP context with session information for the requesting process 402. The network interface module 412 then activates the PDP context thereby opening the connection over the network connection or network interface. It is recognized that other methods or protocols for opening connections may be used. The network interface module 412 can comprise a radio transmitter in order to facilitate data transfer from a network connection (e.g. a protected connection) to a communication network 106.

At 520 the network interface module 412 communicates to the CDSC 406 that the connection to the requested network connection (e.g. the protected connection) is open (i.e. that the PDP context is activated). At 522 the CDSC 406 communicates to the PPS service 300 (e.g. by writing to the PPS object 304) that the connection is open, and at 524, the requesting process 402 receives information from the PPS service 300 (e.g. by reading from the PPS object 304) notifying of the open connection. It is recognized that there are alternative methods of communicating to the requesting process 402 that a network connection is open at a network interface. The CDSC 406 may also communicate to the PPS service 300 other status information in respect of the open network connection including that the blocking rule and allow rule have been applied.

At 526, the requesting process 402 establishes a connection to a socket on the network interface (in association with the network interface module 412, for example). It is understood that a bind operation may have been previously performed on the socket by the network interface module 412 and/or a process operating at or in association with the network interface. It is also understood that other actions to connect the requesting process 402 to the network interface in order to transmit data from the requesting process 402 to the network 106 may be undertaken at this stage.

At 528, the requesting process 402 sends or transmits data across the open connection to the communication network 106. It is understood that the requesting process 402 can also receive data from the communication network 106 across the network interface.

It is understood that the network connection discussed in respect of FIG. 5 can be a single protected connection and that the network interface discussed in respect of FIG. 5 can be associated with the protected connection.

Example Connection Protocol with Managed Data Transfer 600

Figure 6:
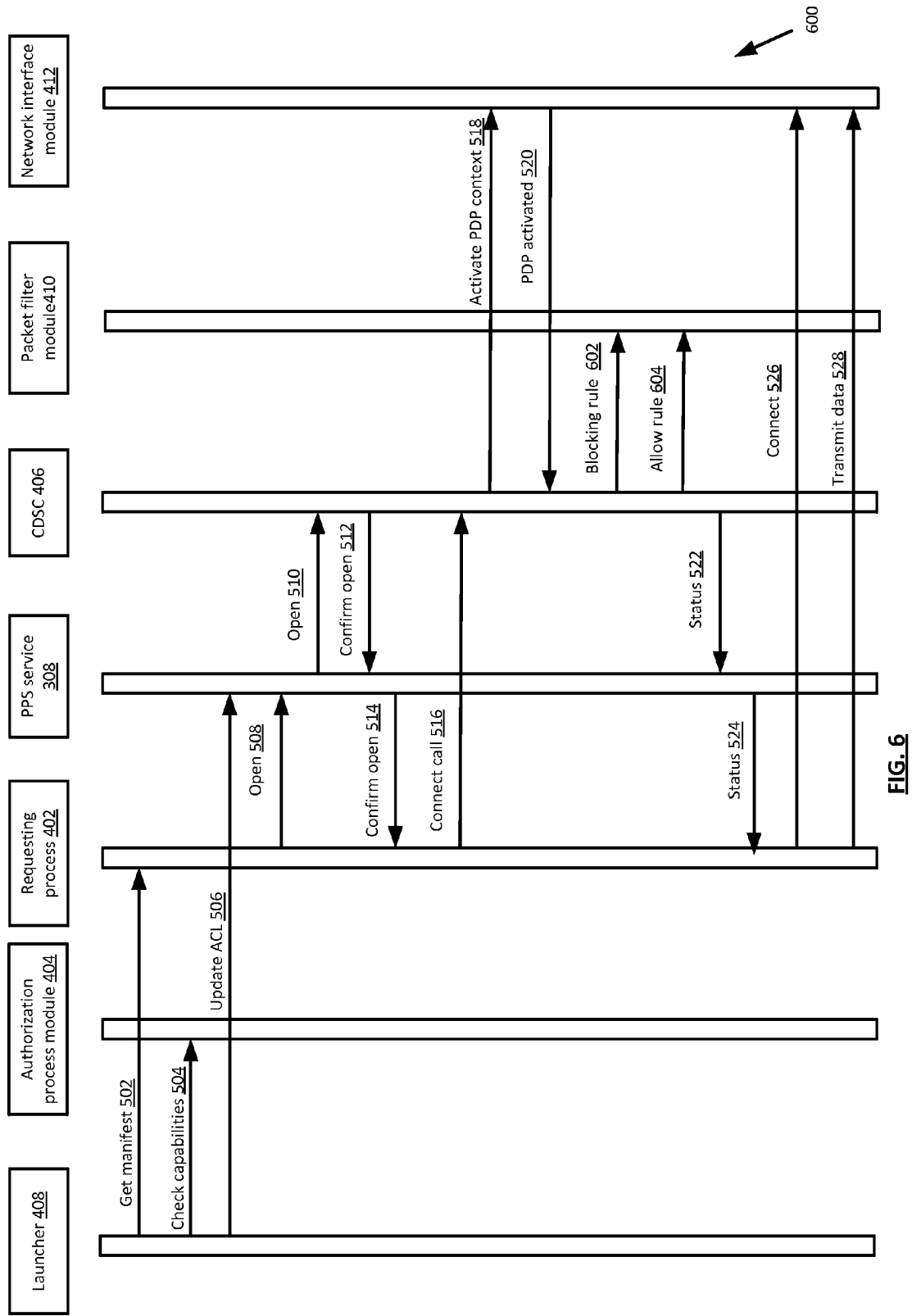
FIG. 6 is a flowchart illustrating the data flow in a communications device to establish a network connection with managed data transfer.

With reference to FIG. 6, a sequence of communications 600 that can be used in accordance with an exemplary embodiment will now be described. The sequence of communications identified at numeral 600 is such that control is maintained over the identity of the applications or processes on a communication device 102 that can establish a connection (e.g. a protected connection) to a communication network 106 (e.g. a wireless network) and that control is maintained over the identity of applications or processes that can transmit data across the protected connection or network interfaces associated with the protected connection.

In accordance with the illustrated embodiment, the stages describes at numerals 502 to 520 are performed as described in the sequence of communications 500 illustrated in FIG. 5.

At 602, which can be performed after the PDP context is activated (at 520 in FIG. 5), the CDSC 406 instructs the packet filter module 410 apply a "block all" rule to all data passing through an identified network interface. It is understood that an alternative blocking rule could be applied that only prevents all data from being transferred from the requesting process 402 to the communication network 106 through the identified network interface and not vice versa. In an embodiment the packet filter module 410 applies the "block all" rule over the network interface in response to the instructions received from the CDSC 406. It is understood that the packet filter module 410 can be in communication with, in association with or be coupled to the network interface module 412 in order to configure the "block all" rule.

At 604 the CDSC 406 instructs the packet filter module 410 to apply the "allow" rule to all data passing through the network interface. In an embodiment, the packet filter module 410 applies the "allow" rule to all data passing across the network interface in response to the instructions received from the CDSC 406. The "allow" rule identifies the requesting process 402 (e.g. by process ID) such that data packets transmitted from the identified requesting process 402 will be permitted pass through the network interface unobstructed. The combination of the "block all" and "allow" rules results in a network interface through which all transmitted data is blocked except for data that is explicitly allowed to pass through in accordance with the "allow" rule. In accordance with an exemplary embodiment, all data that is transmitted from a requesting process 402 or other source identified in the "allow" rule will pass through the network interface despite the application of the "block all" rule. The use of the "allow" rule with the "bock all" rule comprises an example of selective restriction or management of the data that can be communicated over a network connection or network interface.

It is understood that before applying the blocking and allow rules (602 and 604), the packet filter module 410 may first install packet filter rules at the network interface, with the packet filter rules comprising both a blocking filter (e.g. the "block all" rule) and an allow filter rule (e.g. the "allow" rule).

The stages described at 522, 524, 526 and 528 can be performed as described in the sequence of communications 500 illustrated in FIG. 5 and may be performed after the block all rule and allow rule are applied 602, 604.

Example Connection Protocol for a Second Process with Managed Data Transfer 700

Figure 7:
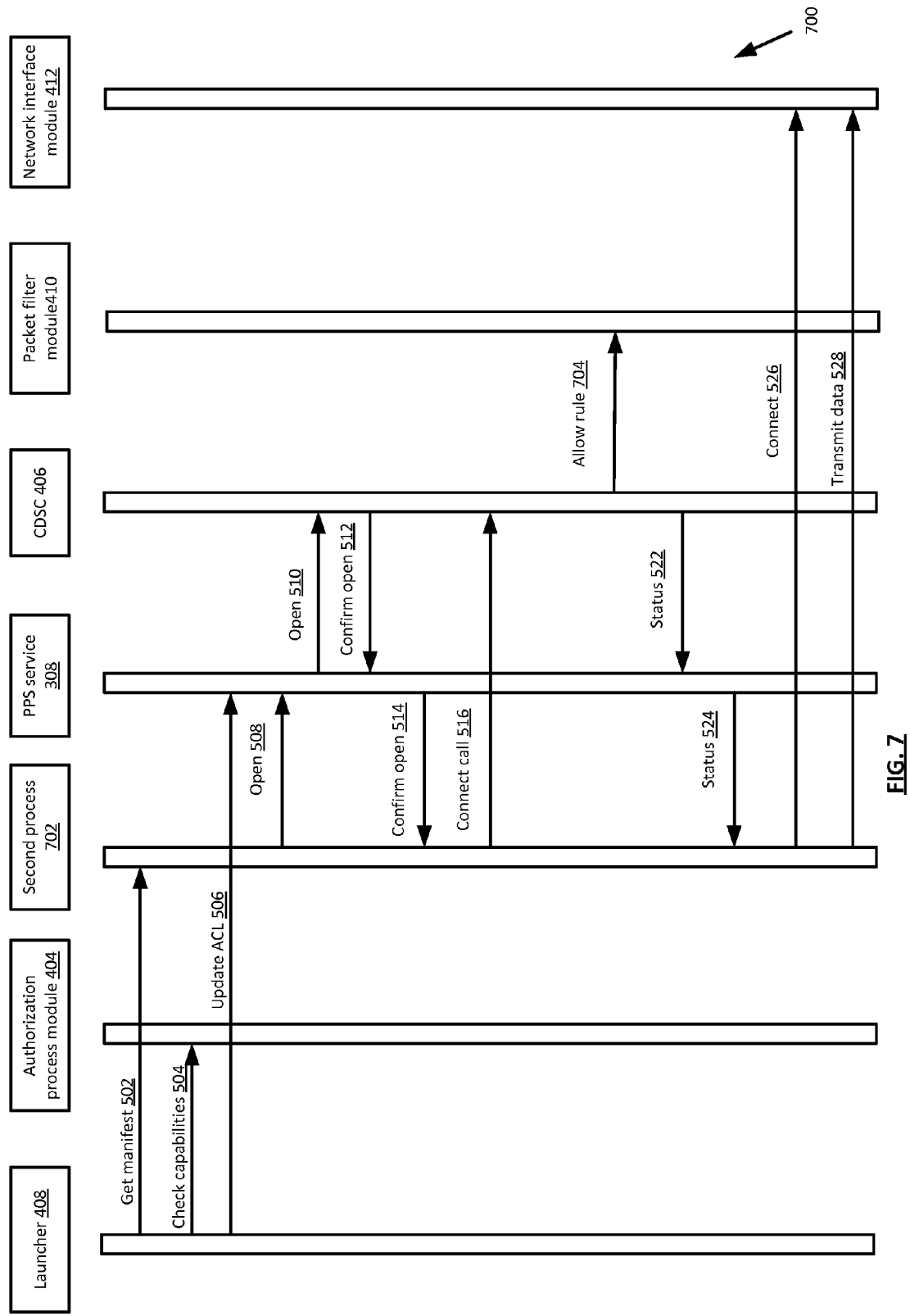
FIG. 7 is a flowchart illustrating the data flow in a communications device to connect a second process to a network connection with managed data transfer.

FIG. 7 is a flowchart illustrating a method 700 of managing data transfer from a second process 702 to the protected connection established following the protocol described with reference to FIG. 6. It is understood that the second process 702 is an example or embodiment of the process 402 described with respect of FIG. 4.

In accordance with the illustrated embodiment, the stages describes at numerals 502 to 516 are performed as described in the sequence of communications 500 illustrated in FIG. 5. It is understood that in one or more embodiments, updating the ACL 506 may not include amending the ACL 506 to list to identity of the second process 702. Instead, updating the ACL 506 may only include verifying that the second process 702 is listed or identified in the ACL. Following the connection call 516, the CDSC 406 instructs the packet filter module 410 to updated the allow rule 704 to include the identification of the second process 702 in the list of processes or applications that are permitted to transmit data across the network interface associated with the protected connection.

After the allow rule is updated 704, the stages identified by numerals 522, 524, 526 and 528 as illustrated and described with reference to FIG. 5 are performed.

As a result of the continued application of the block all rule and the application of the updated allow rule data from the requesting process 402 and from the second process 702 is permitted to be transmitted across the network interface of the protected connection, whereas data from any other application or process will be blocked by the block all rule. This use of the "allow" rule with the "bock all" rule comprises an example of selective restriction or management of the data that can be communicated over a network connection or network interface.

Method of Operation 800, 900, 10000

Figure 8:
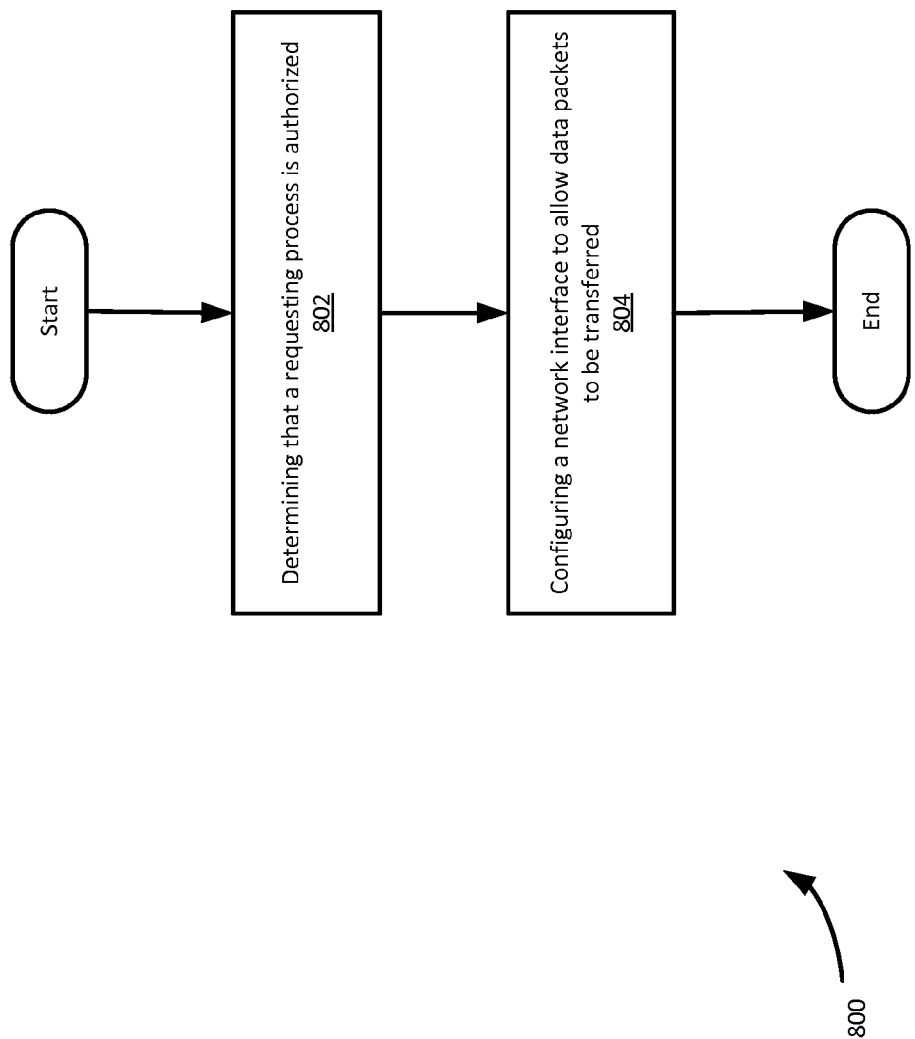
FIG. 8 is a flowchart illustrating a method of managing data transfer across a network interface on a communication device.

FIG. 8 is a flow chart illustrating a method 800 of managing data transfer from a communication device 102 to a communication network 106 over a wireless connection. The communications network 106 can be a cellular network for example. The wireless connection can be a network connection and/or a protected connection. By way of further example, the network connection can be to connect to a GPRS compliant network. The network connection can be accessed by an application or a process operating on a communication device 102 through, for example, a network interface module 412, which is also operating on the communication device 102. More specifically, FIG. 8 illustrates a method 800 of establishing a protected connection between a requesting application 402 and a communication network 106.

At 802 a determination is made as to whether the requesting process 402 on the communication device 102 is authorized to connect to the communication network 106 over a protected connection. The authorization may be based on capabilities of the requesting process 402, on the type of protected connection or on other pre-determined criteria. In an exemplary embodiment, the connection between the requesting process 402 and the communication network 106 through the protected connection is first initiated or established. For example, the capabilities of the requesting process 402 may first be verified and the requesting process 402 may then be configured to request to establish the protected connection.

At 804 a network interface on the communication device 102 is configured to allow data packets to be transmitted from the requesting process 402 to the communication network 106 over the protected connection. The configuration of the network interface on the communication device 102 can include establishing the protected connection so that the network interface is associated with the protected connection. For example a PDP context may be attached and activated in association with the network interface to establish a protected connection between the requesting process 402 and the communication network 106. In an exemplary embodiment, pre-determined rules or filters are applied at the network interface to restrict the type and/or quantity of the data that is sent across the network interface.

Figure 9:
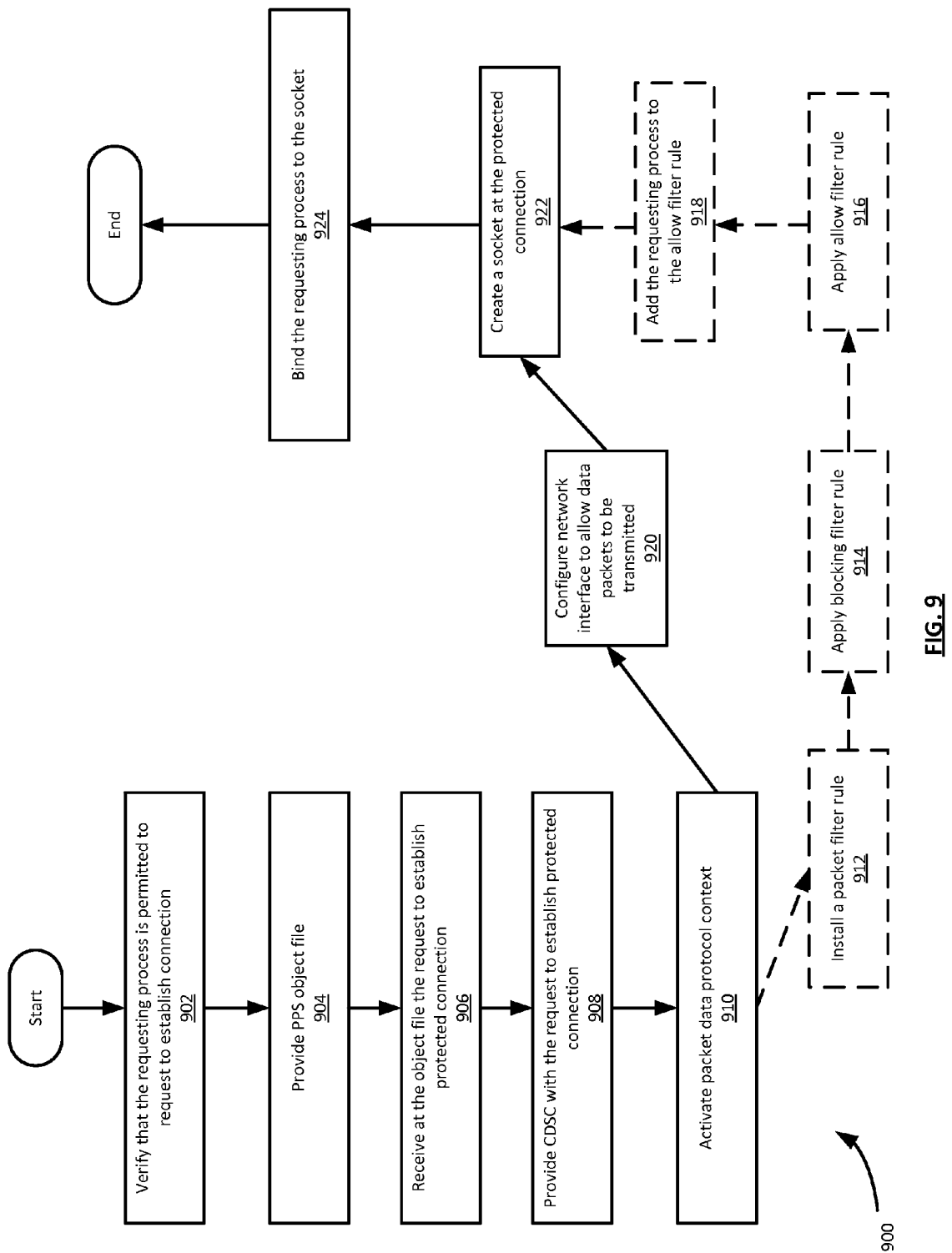
FIG. 9 is a flowchart illustrating a method of managing data transfer across a network interface on a communication device.

Referring to FIG. 9, numeral 900 is an illustration of an exemplary embodiment of managing data transfer from a communication device 102 to a communication network 106 over a wireless connection.

At 902, a verification is made as to whether the requesting process 402 is permitted to request to establish a protected connection to the communication network 106.

In accordance with an exemplary embodiment, verifying that the requesting process 402 is permitted to request to establish the protected connection comprises verifying the capabilities of the requesting process 402. In an example embodiment, the launcher 408 extracts the capabilities of the requesting process 402 and sends the capabilities to the authorization process module 404, where the requesting process 402 is authorized (or declined authorization) based on the extracted capabilities.

In accordance with an exemplary embodiment, verifying that the requesting process 402 is permitted to request to establish the protected connection comprises verifying with an ACL 308 that the requesting process 402 is permitted to transfer data across the protected connection to the communication network 106. The ACL 308 can maintain the identification of applications or processes or other sources that are permitted to transfer data across or over a protected connection to the communication network 106. In accordance with an embodiment, the identity of the requesting process 402 can be added to the ACL 308. For example, the authorization process module 404 can also update the ACL 308 to indicate (in the ACL 308) that the requesting process 402 is permitted to request to establish a protected connection to the communication network 106. For example, the authorization process module 404 can update the ACL 308 to indicate that the requesting process 402 is permitted to request to establish the protected connection based on the capabilities of the requesting process 402 (as extracted by the launcher 408, for example).

At 904, a PPS object 304 is provided in response to verifying that the requesting process 402 is permitted to request to establish the protected connection. The PPS object 304 is for managing requests to establish protected connections or to connect to existing protected connections. For example the PPS object 304 manages requests from applications or processes running, executing or operating on the communication device 102. In accordance with an embodiment, the requesting process 402 requests to open the PPS object 304 from the PPS module 310 or the CDSC 406. The PPS module 310 or the CDSC 406 may determine whether the requesting process 402 is identified in the ACL 308 and, if so, the PPS object 304 may be opened for the requesting process 402. If the requesting process 402 is not identified in the ACL 308, the PPS object 304 may not be opened for the requesting process 402. If the PPS object 304 is not opened, the requesting process 402 may not be able to communicate with the CDSC 406 and may not be able to open the PPS object 304. The ACL 308 may also contain permissions identifying applications or processes that are permitted to open the PPS object 304 or identifying applications or processes that are permitted to request to connect to the protected connection.

At 906, a request to establish the protected connection is received at the PPS object 304 from the requesting process 402. For example, the requesting process 402 can write a message to the PPS object 304 requesting to establish the protected connection. According to an embodiment, the message comprises the identity of the requesting process 402 (e.g. the process ID) and the identity of communication network 106.

At 908, the CDSC 406 is provided with the request to establish the protected connection from the PPS object 304. For example, the CDSC 406 can read the message from the PPS object 304 written by the requesting process 402 requesting to establish the protected connection. The CDSC 406 may be configured to request that a PDP context be activated in order to open or initiate the protected connection in response to receiving or reading the request to establish the protected connection from the requesting process 402 (through the PPS object 304).

It is understood that other types of communication methods could be used (e.g. other object files) to allow or to manage communications between processes on a communication device 102. It is recognized that other methods alternative to a PPS service 300 (stages 904, 906 and 908) can be used to configure the requesting process 402 to request to establish to the protected connection.

At 910, in response to initiating the protected connection between the requesting process 402 and the communication network 106, a PDP context is activated to allow data to be transferred or transmitted across the network interface to the communication network 106. In an embodiment the PDP context may also be attached. In the illustrated embodiment, the CDSC 406 requests that the network interface module 412 activate (and/or attach) the PDP context. In a further example, the PDP context is populated at the CDSC 406 before the CDSC 406 requests or instructs the network interface module 412 to activate the PDP context. The network interface module 412 may transmit a confirmation message to the CDSC 406 indicating that the PDP is activated.

At 920, a network interface on the communication device 102 is configured to allow data packets to be transmitted from the requesting process 402 to the communication network 106 over the protected connection. For example, the network interface may be the interface between the communication device 102 and the communication network 106. In certain embodiments, such configuration may be such that a set of pre-determined rules is applied onto the network interface in order to selectively restrict or manage the transfer of data across the protected connection. The pre-determined rules can be based on identified applications or identified processes such that only the identified applications or identified processes are permitted to transfer data across the network interface. In a further embodiment, only identified types, formats or structures of data may be permitted to be transferred across the network interface.

An exemplary embodiment of configuring the network interface on the communication device 102 to allow data packets to be transferred from the requesting process 402 to the communication network 106 over the protected connection is illustrated in dashed lines at stages 912, 914, 916 and 918. Stages 912, 914, 916 and 918 may be performed by the packet filter module 410, for example. The packet filter module 410 can be operating under instructions from the CDSC 406.

At 912, packet filter rules are installed. For example, the packet filter rules can be installed at the network interface by the packet filter module 410. The packet filter rules comprise a blocking filter rule that restricts transfer of data from all applications, processes or other sources across the network interface, and an allow filter rule comprising the identification of applications, processes or other sources to which the blocking filter rule does not apply. It is recognized that such packet filter rules may already be installed and in such a case packet filter rules may not be re-installed. The blocking filter rule can be the "block all" rule, described above. The allow filter rules can be the "allow" filter rule, described above.

At 914, the blocking filter rule is applied on the network interface.

At 916, the allow filter rule is applied on the network interface. It is recognized that the allow filter rule could be configured to allow data to be transmitted over the network interface based on criteria other than the identification of the application, process or other source from which the data is transmitted from. Example criteria could include the size of the data stream, the type of data, the structure of data, the format of data, etc.

At 918, the requesting process 402 is added to the allow filter rule so that the blocking filter rule does not apply to the requesting process 402. In an embodiment, the blocking filter rule blocks all data transferred or transmitted over the network interface except for data transmitted from the applications, process or other sources identified in the allow filter rule (such as the requesting process 402).

After the network interface is configured to allow data packets to be transmitted from the requesting process 402 to the communication network 106 (e.g. using the packet filter module 410 described at stages 912, 914, 916 and 918), a socket can be created at the protected connection, at 922. At 924 the requesting process 402 can then be bound (e.g. using a bind operation) to the socket to allow the requesting process 402 to transmit data over or across the network interface (i.e. across the protected connection). It is recognized that the "socket" and "bind" operations can be performed by the network interface module 412 or another process or module.

Figure 10:
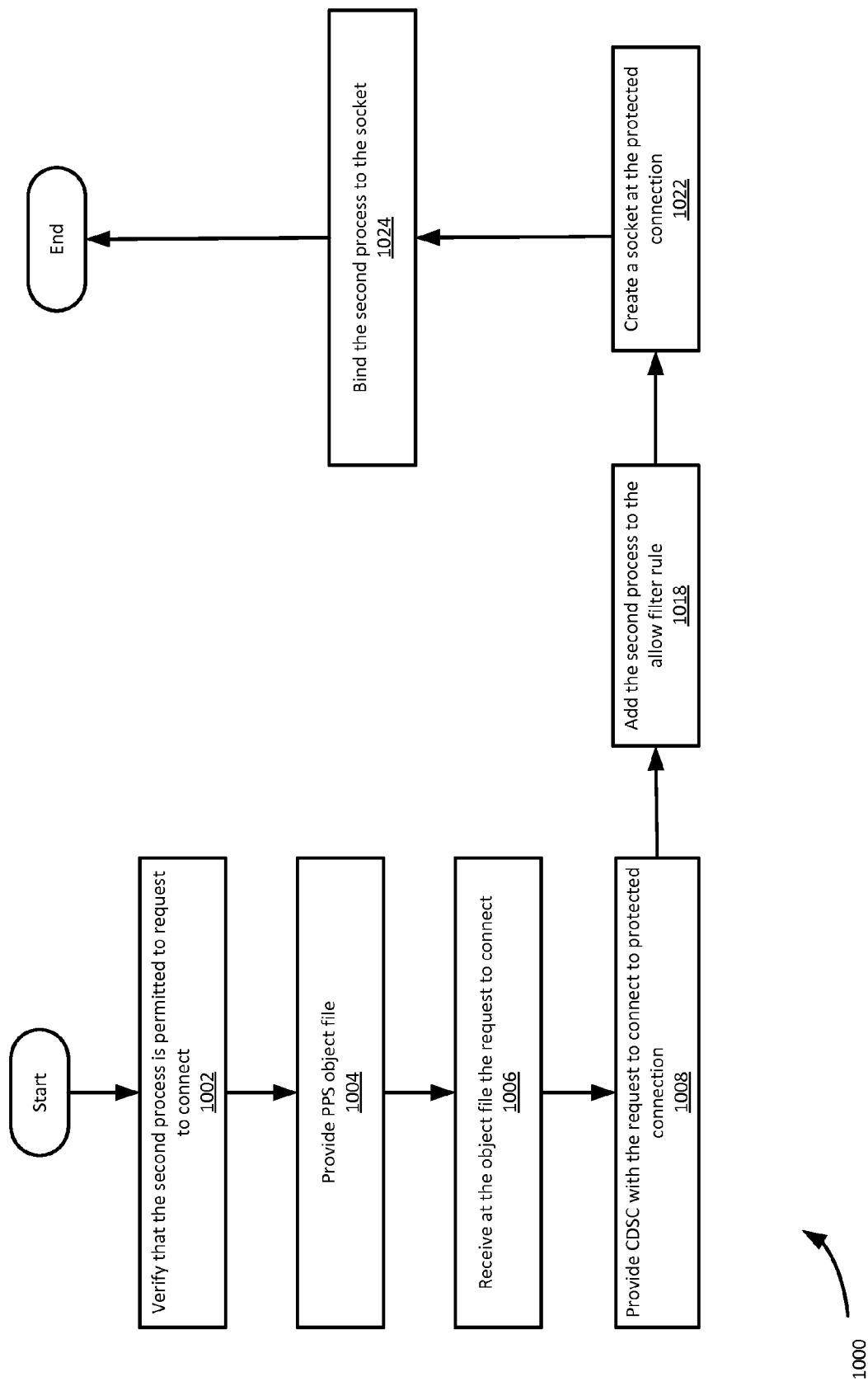
FIG. 10 is a flowchart illustrating a method of managing data transfer across a network interface on a communication device.

FIG. 10 illustrates an exemplary embodiment of a method 1000 of managing data transfer from a process across a protected connection. More specifically, the illustrated method 1000 is for managing data transmission from a second process 702 across a protected connection established in accordance with the method 900 described in reference to FIG. 9.

At 1002, a verification is made as to whether the second process 702 is permitted to request to connect to the communication network 106 across the protected connection.

In accordance with an exemplary embodiment, verifying that the second process 702 is permitted to request to connect to the communication network 106 across the protected connection comprises verifying the capabilities of the second process 702. In an example embodiment, the launcher 408 extracts the capabilities of the second process 702 and sends the capabilities to the authorization process module 404, where the second process 702 is authorized (or declined authorization) based on the extracted capabilities.

In accordance with an exemplary embodiment, verifying that the second process 702 is permitted to request to connect to the communication network 106 across the protected connection comprises verifying with an ACL 308 that the second process 702 is permitted to transfer data across the protected connection to the communication network 106. In accordance with an embodiment, the identity of the second process 702 can be added to the ACL 308. For example, the authorization process module 404 can update the ACL 308 to indicate (in the ACL 308) that the second process 702 is permitted to request to connect to the communication network 106 across the protected connection. For example, the authorization process module 404 can update the ACL 308 to indicate that the second process 702 is permitted to request to connect to the communication network 106 across the protected connection based on the capabilities of the second process 702 (as extracted by the launcher 408, for example).

At 1004, a PPS object 304 is provided in response to verifying that the second process 702 is permitted to request to connect to the communication network 106 across the protected connection. In accordance with an embodiment, the second process 702 requests to open the PPS object 304 from the PPS module 310 or the CDSC 406. The PPS module 310 or the CDSC 406 may determine whether the requesting process 402 is identified in the ACL 308 and, if so, the PPS object 304 may be opened for the second process 702. If the second process 702 is not identified in the ACL 308, the PPS object 304 may not be opened for the second process 702. If the PPS object 304 is not opened, the second process 702 may not be able to communicate with the CDSC 406 and may not be able to open the PPS object 304. The ACL 308 may also contain permissions identifying applications or processes that are permitted to open the PPS object 304 or identifying applications or processes that are permitted to request to connect to the communication network 106 across the protected connection.

At 1006, a request to connect to the communication network 106 across the protected connection is received at the PPS object 304 from the second process 702. For example, the second process 702 can write a message to the PPS object 304 requesting to connect to the communication network 106 across the protected connection. According to an embodiment, the message comprises the identity of the second process 702 (e.g. the process ID), the identity of communication network 106 and the identity of the protected connection.

At 1008, the CDSC 406 is provided with the request to connect to the communication network 106 across the protected connection from the PPS object 304. For example, the CDSC 406 can read the message from the PPS object 304 written by the second process 702 requesting to connect to the communication network 106 across the protected connection.

Other methods alternative to a PPS service 300 (stages 1004, 1006 and 1008) can be used to configure the second process 702 to request to connect to the communication network 106 across the protected connection.

At 1018 the second process 702 is added to the allow filter rule associated with the protected connection so that the block all rule associated with the protected connection is not applied to data transmitted from the second process 702 across the protected connection. Adding the second process 702 or the identification of the second process 702 (e.g. the process ID of the second process 702) to the allow filter rule configures the network interface to allow data packets to be transmitted from the second process 702 to the communication network 106 across the protected connection.

At 1022, a socket is created at the protected connection, at 922. At 1024 the second process 702 can then be bound (e.g. using a bind operation) to the socket to allow the second process 702 to transmit data over or across the network interface (i.e. across the protected connection).

One or more embodiments have been described by way of example. It will be apparent to persons skilled in the art that a number of variations and modifications can be made without departing from the scope of what is defined in the claims.

The invention claimed is:

1. A method implemented on a communication device for managing data transfer from the communication device to a communication network over a wireless connection, the communication device having a cellular data services controller to establish and control access to a protected connection over the communication network, the method comprising:
   determining that a requesting process on the communication device is authorized to transfer data to the communication network over the protected connection based on a process ID associated with the requesting process, wherein determining includes
      sending an authorization request from the requesting process via a persistent publish and subscribe service designated for the protected connection, and wherein the requesting process is a permitted subscriber of the persistent publish and subscribe service,
      verifying that the requesting process is permitted to access the protected connection,
      responding, by the cellular data service controller, to the authorization request via the persistent publish and subscribe service, and
      activating a PDP context to connect the requesting process to the protected connection; and,
   after activating the PDP context, the cellular data services controller configuring a network interface on the communication device to allow data packets to be transferred from the requesting process to the communication network over the protected connection, wherein the network interface is associated with the protected connection.

2. The method of claim 1, wherein verifying that the requesting process is permitted to access the protected connection comprises extracting data associated with the requesting process to verify the capabilities of the requesting process.

3. The method of claim 1, wherein verifying that the requesting process is permitted to access the protected connection comprises verifying with an access control list that the requesting process is permitted to transfer data across the protected connection to the communication network, wherein the access control list comprises the identification of processes that are permitted to transfer data across the protected connection to the communication network.

4. The method of claim 3, further comprising adding the identity of the requesting process to the access control list.

5. The method of claim 1, wherein configuring a network interface comprises:
   applying a blocking filter rule on the network interface to block the transfer of data from all processes across the network interface; and
   after applying the blocking filter rule, applying the allow filter rule on the network interface to permit transfer of data from the requesting process across the network interface.

6. The method of claim 1, further comprising adding a second process to the allow filter rule to permit the second process to transfer data across the network interface.

7. The method of claim 1, wherein activating the PDP context further comprises:
   creating a socket at the protected connection; and
   binding the requesting process to the socket to allow the requesting process to transmit data across the network interface.

8. The method of claim 1, further comprising:
   determining that a second process on the communication device is authorized to transmit data to the communication network across the protected connection; and,
   configuring a network interface on the communication device to allow data packets to be transmitted from the second process to the communication network over the protected connection.

9. The method of claim 1 wherein the communication network is a cellular network, and the protected connection is a zero-rated cellular data connection to a carrier.

10. A communication device for managing data transfer from the communication device to a communication network over a protected connection, the communication device comprising:
   a processor and memory;
   a persistent publish and subscribe service designated for the protected connection to receive an authorization request from a requesting process, wherein the requesting process is a permitted subscriber of the persistent publish and subscribe service;
   an authorization process module stored in memory and executable by the processor to verify that the requesting process is permitted to access the protected connection;
   a cellular data services controller stored in memory and executable by the processor to respond to the authorization request via the persistent publish and subscribe service, and to activate a PDP context to connect the requesting process to the protected connection;
   a network interface on the communication device;
   wherein the cellular data services controller configures the network interface to allow data packets to be transmitted from the requesting process to the communication network over the protected connection, wherein the network interface is associated with the protected connection.

11. The communication device of claim 10, wherein the authorization process module is configured to verify the capabilities of the requesting process by extracting data associated with the requesting process, the capabilities for indicating that the requesting application is permitted to transfer data to the communication network across the protected connection.

12. The communication device of claim 10, further comprising an access control list comprising the identifications of processes permitted to transfer data across the protected connection to the communication network, and wherein at least one of the authorization process module and the cellular data services controller is configured to verify the identity of the requesting process with the access control list.

13. The communication device of claim 10, further comprising a packet filter module coupled to the cellular data services module, the packet filter module configured to:
   apply a blocking filter rule on the network interface to block the transfer of data from all processes across the network interface; and
   after to applying the blocking filter rule, apply the allow filter rule on the network interface to permit transfer of data from the requesting process across the network interface.

14. The communication device of claim 10, wherein the network interface module is configured to:
   create a socket at the protected connection; and
   bind the requesting process to the socket to allow the requesting process to transmit data across the protected connection at the network interface.

15. The communication device of claim 10, wherein the authorization module is further configured to authorize a second process to connect to the communication network across the protected connection.

16. A communication device for controlling data transfer across a network interface of a communication network, the communication device having a cellular data services controller to establish and control access to a protected connection over the communication network, the communication device comprising:
   a memory; and,
   computer readable instructions stored on memory and executable by a processor to:
   determine that a requesting process on the communication device is authorized to transfer data to the communication network across the protected connection based on a process ID associated with the requesting process, wherein determining includes
      sending an authorization request from the requesting process via a persistent publish and subscribe service designated for the protected connection, and wherein the requesting process is a permitted subscriber of the persistent publish and subscribe service,
      verifying that the requesting process is permitted to access the protected connection,
      responding, by the cellular data service controller, to the authorization request via the persistent publish and subscribe service, and
      activating a PDP context to connect the requesting process to the protected connection; and
   configure a network interface on the communication device, after activating the PDP context, the cellular data services controller, to allow data packets to be transmitted from the requesting process to the communication network over the protected connection, wherein the network interface is associated with the protected connection.

17. A computer readable storage medium comprising computer-executable instructions for controlling data transfer across a network interface of a communication network, the communication device having a cellular data services controller to establish and control access to a protected connection over the communication network, wherein the instructions, when executed, cause a processor of a communication device to:
   determine that a requesting process on the communication device is authorized to transfer data to the communication network across the protected connection based on a process ID associated with the requesting process, wherein determining includes
      sending an authorization request from the requesting process via a persistent publish and subscribe service designated for the protected connection, and wherein the requesting process is a permitted subscriber of the persistent publish and subscribe service,
      verifying that the requesting process is permitted to access the protected connection,
      responding, by the cellular data service controller, to the authorization request via the persistent publish and subscribe service, and
      activating a PDP context to connect the requesting process to the protected connection; and,
   configure a network interface on the communication device, after activating the PDP context, the cellular data services controller, to allow data packets to be transmitted from the requesting process to the communication network over the protected connection, wherein the network interface is associated with the protected connection.

* * * * *